INVENTORS
ISAAC MARCOVITCH
JACOB MARCOVITCH
BY Young & Thompson
ATTYS.

INVENTORS
ISAAC MARCOVITCH
JACOB MARCOVITCH
BY Young & Thompson
ATTYS.

INVENTORS
ISAAC MARCOVITCH
JACOB MARCOVITCH
BY Young & Thompson
ATTYS.

INVENTORS
ISAAC MARCOVITCH
JACOB MARCOVITCH
BY Young & Thompson
ATTYS.

INVENTORS
ISAAC MARCOVITCH
JACOB MARCOVITCH
BY Young + Thompson
ATTYS

United States Patent Office

Re. 26,594
Reissued May 27, 1969

26,594

MACHINE FOR ROLL-FORMING AN ANNULAR WORKPIECE INCLUDING A SEPARATE ROTATABLE CORE

Isaac Marcovitch, Johannesburg, Transvaal, Republic of South Africa, and Jacob Marcovitch, Johannesburg, Transvaal, Republic of South Africa (% Genpat, P.O. Box 31524, Braamfontein, Transvaal, Republic of South Africa); said Isaac Marcovitch assignor to said Jacob Marcovitch, Johannesburg, Transvaal, Republic of South Africa

Original No. 3,345,845, dated Oct. 10, 1967, Ser. No. 388,587, Aug. 10, 1964. Application for reissue Aug. 1, 1968, Ser. No. 753,813

Claims priority, application Republic of South Africa, Aug. 12, 1963, 63/3,621; Jan. 22, 1964, 64/299; Mar. 20, 1964, 64/1,323

Int. Cl. B21b *17/00, 19/04;* B21c *45/00*

U.S. Cl. 72—80 12 Claims

Matter enclosed in heavy brackets [ ] appears in the original patent but forms no part of this reissue specification; matter printed in italics indicates the additions made by reissue.

*ABSTRACT OF THE DISCLOSURE*

*A machine for profiling annular workpieces by pressure between a core which is loosely threaded through a workpiece to contact its inner face, and a surface which contacts the outer face. The ends of the core are supported by, and roll on, another surface. The core is thus not fixed in bearings but is free to advance through the machine. An anvil ring may surround the workpiece to limit its diametral spread and prescribe the profile of its outer face. The surfaces defining the space or throat in which profiling takes place may be provided by rotating rollers, or reciprocating elongated bodies, or the like.*

*Background of the invention*

This invention relates to the art of profiling [workpieces, in which the workpiece is coerced to pass through a throat defined by opposed walls at least one of which is profiled and which imposes its profile on each workpiece as it advances through the throat. The throat may be and usually is defined by two opposed rollers one or both of which is or are rotated.]

[The rollers may be arranged for their outer surfaces to define the walls of the throat; or the throat may be defined by the inner wall of a hollow roller and the outer wall of a roller within the cavity of the hollow roller. The latter construction has the advantage that the throat can be made of considerably greater length and correspondingly gentler taper than is practically possible with the former construction.]

[Hitherto, no machine appears to have existed which can be used to profile hollow workpieces. Workpieces advancing through the throat are subjected to heavy radially inward pressure tending to collapse the workpiece inwardly, which has restricted the scope of known profiling machines to solid workpieces. The insertion of a core into a hollow workpiece to prevent collapse would achieve nothing as the core would emerge tightly and inextricably wedged within the workpiece.]

[Obviously, a machine which could be used to profile hollow bodies such as rings would be of great industrial significance, as it could produce, quickly and cheaply, articles which at present must be ground or machined to shape. The object of this invention is to provide just such a machine.]

[According to the invention, a method of profiling a hollow workpiece consists in threading it loosely on to a robust core that projects to each side of it, contacting the outer surface of the workpiece with a profiling surface, contacting at least the projecting ends of the core with a second surface, and moving the surfaces relatively to one another in a manner calculated to reduce the thickness of material between the profiling surface and the core whilst rotating the core about its axis] *annular workpieces by rolling them between an inner member which extends through the workpiece cavity to contact the inner face of the workpiece and an outer member that contacts the outer face of the workpiece. A segment of the workpiece is squeezed between the members, and with appropriate relative movement the workpiece turns between the members and is progressively squeezed between them, segment by segment, until it has been fully profiled. The profile may be imposed either on the inner or the outer face of the workpiece, or on both.*

*In the prior art, the inner member is a work roller whose axis is stationary in the machine, being mounted in bearings at each end or cantilevered from a single bearing. Where the inner roller is held in bearings at each end, it is necessary to free at least one end from its bearing each time a workpiece is loaded or unloaded. If the inner roller is cantilevered, it loses rigidity.*

*Summary of the invention*

*The object of the invention is to provide a novel machine for profiling annular workpieces, and particularly a machine in which the inner member that works on the inner face of the workpiece is not fixed in bearings but is free to advance through the machine while it is threaded through the workpiece.*

*The machine of the invention comprises two juxtaposed surfaces that define a convergent throat, a core adapted to be loosely threaded through an annular workpiece with an end projecting to each side of the workpiece, one of the surfaces being adapted to support the ends of the core while a zone of the core between its ends contacts the inner surface of the workpiece, and the second surface being adapted to contact the outer face of the workpiece so that a segment of the workpiece is squeezed between the core and the second surface; and means to move the surfaces relatively so that the workpieces and core rotate and advance through the throat with the core ends rolling on the first surface, and the workpiece being progressively squeezed and profiled between the core and the second surface.*

It will be seen, therefore, that what is proposed is a system in which the core [acts as an anvil which] buttresses the workpiece against the force applied by the profiling surface and is itself buttressed by the [second] *first* surface. [It follows that the workpiece can be outwardly profiled by the profiling surface, or inwardly by the core. Thus a hollow workpiece can be profiled at its outer surface, or at its inner surface, or at both.]

[Apparatus according to the invention to carry out this method is characterized by a core at least the ends of which are cylindrical and roll upon the first surface, which core is adapted to be surrounded by an annular workpiece and to have a zone between the ends spaced from the second surface by the thickness of the workpiece.] The surfaces are usually provided by juxtaposed rollers.

The rollers may be arranged [in the conventional fashion,] with their *convex* peripheries opposed to one another, in which case either roller may be recessed *to accommodate a segment of the workpiece, the ends of the core rolling on the roller surface to each side of the recess.* The recess may be a groove in the thickness of the roller, or it may be formed by splitting the roller circumferentially into two coaxial rollers arranged side by side but with a gap between them that constitutes the recess.

Alternatively, one *convex* roller may be located within the cavity of [the other] *a hollow roller,* in which case, again, the recess may be a groove in the internal face of one roller or in the external face of the other; or [either roller] *one of the two rollers* may be in two parts spaced apart.

Whatever arrangement is used, the workpiece has a core [inserted] *loosely threaded* into its cavity and it and the core are offered to the throat, with the core eccentric within the cavity and in contact with the inner face of the workpiece. The core [is] *may be* of considerably smaller diameter than the internal diameter of the workpiece. The workpiece is fed into the throat with [part] *a segment* of it within the recess. [The throat straddles the workpiece and the core and as] *As* the workpiece and core are advanced through the throat the [profile of the roller or the core or both are imposed on the ring, inwardly or outwardly, or inwardly and outwardly, as the case may be] *workpiece is squeezed segment by segment between the core and the profiling roller, and is thus progressively profiled.*

*Brief description of the drawings*

Embodiments of apparatus according to the invention are shown in the accompanying drawings in which—

*Description of the preferred embodiments*

Figure 1:
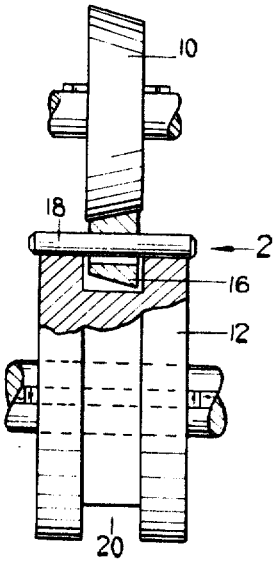
FIGURE 1 is an end view, partly sectioned, of one embodiment.
Figure 2:
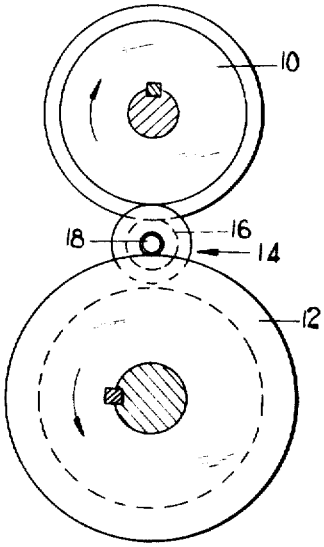
FIGURE 2 is a side view of the same embodiment.

In FIGURES 1 and 2 two *convex* rollers 10, 12 are juxtaposed to define a throat 14, *FIGURE 2,* between them. The rollers are driven in opposite directions *as shown by the arrows in FIGURE* 2. The workpiece 16 is a ring in the cavity of which is *loosely threaded* a core 18. The roller 12 is wider than the ring 16 and the ends of the core 18 project beyond the ring and [bear on] *contact* the flanks of the roller 12. The roller 10 is shown as narrower than the roller 12 but this is of no importance. The roller 12 is recessed circumferentially at 20 to accommodate the ring 16. The axes of the rollers are parallel.

The rollers are so dimensioned, and driven at such [relative] *relatively different peripheral* speeds, that when the workpiece 16 and its core 18 are presented to the throat 14 they are nipped and coerced to pass into and through the throat. These dimensions and speeds are not discussed because the principles are well known.

The ring is deformed to the shape imposed on it by the roller 10 and/or the core 18. As shown, the roller 10 is frusto-conical, so that the ring will emerge with a complemental outer surface. [Sufficient material is provided in the ring, of course, to result in the desired deformation without surplus metal.]

Figure 3:
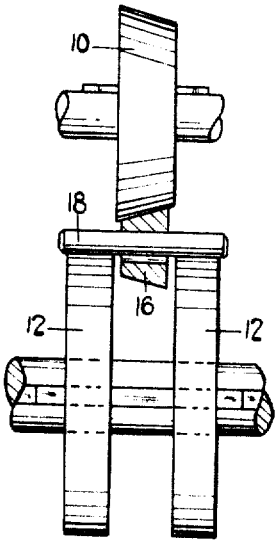
FIGURE 3 is an end view, partly sectioned, of a second embodiment.

The same results can be achieved by splitting the roller 12 into two, as shown in FIGURE 3.

Figure 4:
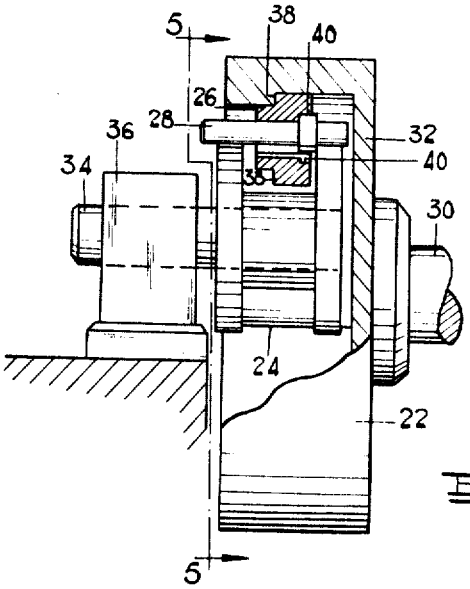
FIGURE 4 is an end view, partly sectioned, of a third embodiment.
Figure 5:
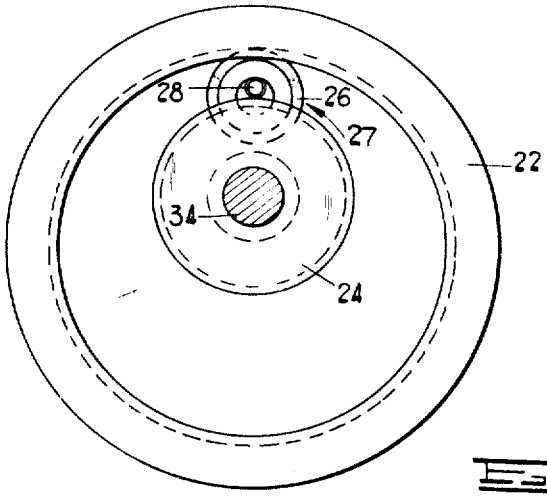
FIGURE 5 is a side view [of the same embodiment] *along the line 5—5 in FIGURE 4,*

In FIGURES 4 and 5, one roller 22 is hollow and the second roller 24 is within its cavity. A throat [26] *27, FIGURE 5,* is defined between the inner face of the roller 22 and the outer face of the roller 24. The workpiece 26 advances towards the throat with the core 28 within it. *The internal wall of the* roller 22 is trough-shaped and *the roller* is driven through a shaft 30 fast with its radial wall 32. The roller 24 is mounted on a shaft 34 journalled in a pillar bearing 36.

The workpiece 26 is shown here to be deformed to provide an external rebate 38 and an internal recess 40, merely to illustrate the sort of thing that can be done.

Figure 6:
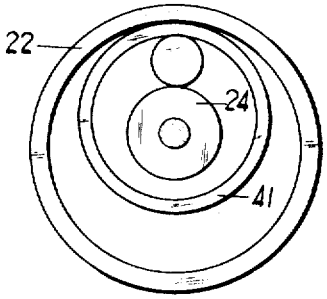
FIGURE 6 is a view similar to FIGURE 5 of another embodiment.

In FIGURE 6 the ring 41 surrounds [the] *a convex* roller 24 which in turn is within the cavity of [the] *another* roller 22 as in FIGURES 4 and 5. In this sort of case all that is required is a suitable regulation of the roller speeds to ensure that the workpiece 41 makes the required number of passes through the throat. With a suitable workpiece 41 the finished product can be expanded into intimate contact with the inside face of the roller 22 so that the outer contour of the finished product is rigidly prescribed.

Figure 7:
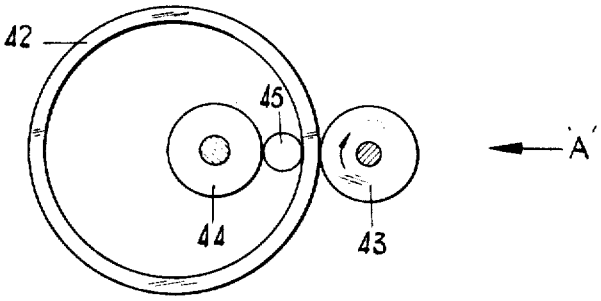
FIGURE 7 is a view similar to FIGURE 5 of still another embodiment.
Figure 8:
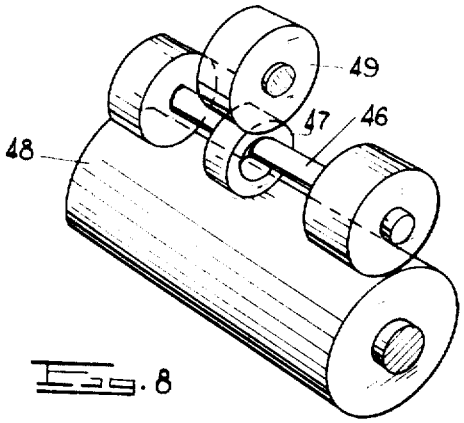
FIGURE 8 is a perspective view diagrammatically illustrating a further embodiment.

The same kind of arrangement is possible with two [externally abutting] *convex* rollers as is shown in FIGURE 7. In the above examples the workpiece is either accommodated in a recess in a roller *so that the workpiece and core advance through the throat and pass from one side to the other of the plane defined by the roller axes* or *the workpiece* surrounds a roller. It is also possible to accommodate the workpiece in a recess in the core. Such a case is illustrated in FIGURE [8] *5* where the core 46 is dumbbell-shaped with one end detachable for the insertion of a workpiece 47. The ends of the core 46 straddle one roller [48] *49* and press on an unrecessed roller [49] *48.*

Figure 9:
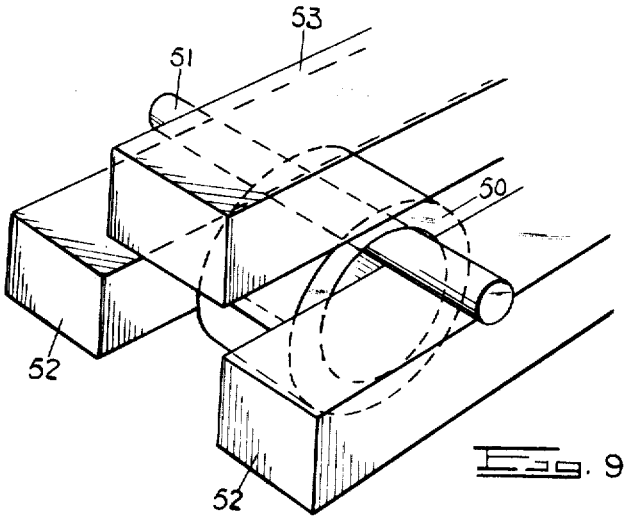
FIGURES 9 and 10 are views of an embodiment employing planar surfaces.
Figure 10:
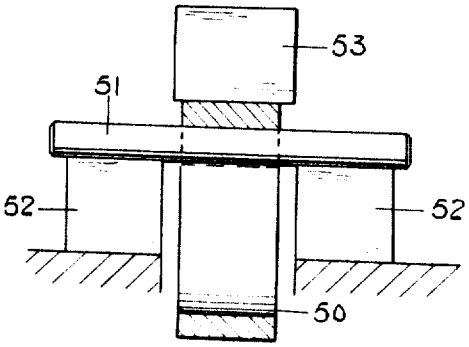

The working surfaces need not necessarily be provided by rollers. [As shown in] *In* FIGURES 9 and 10 they [may be] *are flat or* planar. In this case, a workpiece 50 is threaded on to a core 51 which rests on two parallel rails 52. A third rail 53 presses upon the workpiece 50. To-and-fro movement of, say, the rail 53 in a well-known manner may be used to profile the workpiece.

In order to obtain a finished product of exact required diameter using the methods outlined above, it is necessary to start off with an accurately prepared blank workpiece and all blanks of a series have to be almost identical in weight and dimension. This preparation usually involves machining, which defeats the object of the process to some extent.

In a ring the dimensions that are usually important are the outer or inner diameters. Getting the axial dimension precise is not usually troublesome because a final [grinding] *machining* operation to reduce the ring to size axially is easily performed, *using one side face produced in the rolling operation as a reference face.*

Figure 11:
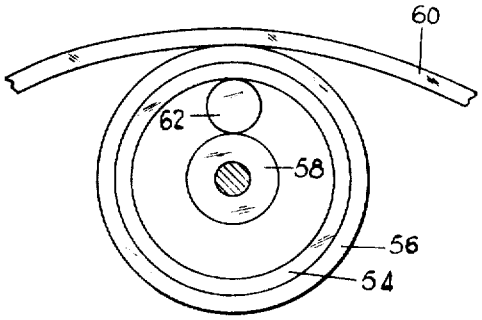
FIGURE 11 is a partial side view of another embodiment.

In the arrangement of FIGURE 11, the outer diameter of the [ring] *workpiece* 54 is held to a requisite dimension by encasing [the ring] *it* within an anvil ring 56, the inner diameter of which is exactly that which is required for the outer diameter of the workpiece, and which is of very hard material relatively to the material of the workpiece [for example tungsten carbide when the workpieces are of mild steel].

The anvil ring 56, with the workpiece 54 within its cavity, is inserted between inner and outer rollers 58, 60, with a core 62 between the outer surface of the inner roller 58 and the inner surface of the workpiece 54, as in the case of the FIGURE 6 arrangement [or, if the rollers be solid and juxtaposed, then as in the case of the FIGURE 7 arrangement].

There is, of course, the problem of extracting the finished product from the cavity of the anvil ring. If the nature of the product permits, the outer diameter may have a draw taper, and lubricant is spread between the [juxtaposed surfaces] *workpiece and anvil ring* to facilitate extraction. If a draw taper is not practicable, the anvil material may be so selected that the differential coefficients of expansion of anvil ring and workpiece cause the finished workpiece to loosen in the anvil ring on cooling or heating, sufficiently to permit extraction. The cooling may follow the natural heating due to the deformation of the workpiece, or the workpiece may be heated before or during handling. Alternatively, though improbably, the anvil ring and the trapped product may be heated or cooled together to promote suitable extraction conditions.

Endwise extraction of this kind can only be achieved where the contacting surfaces are not keyed together. Thus, if the profile imposed on the workpiece by the anvil ring is tapered or stepped, endwise extraction is practicable. If other profiles are formed that cause keying, the anvil ring may be made collapsible for instance rather like a barrel; but clearly this device will only be commercially useful if the value of the finished product is high enough to bear the cost of the collapsible anvil ring and the handling required to collapse and to reassemble it.

Usually the blank for the workpiece will be selected so that excess metal is present. In order to ensure that the excess metal flows to one side, the core may be formed with a shoulder adapted to overlap and run against one annular face of the ring *to control or stop its axial spread in that direction,* the excess metal being forced to the [open gap on the] opposite side between the core and the ring. The excess metal may then be removed by a very simple operation.

The inner surface of the anvil ring may be tapered or even stepped in the axial direction or otherwise profiled, as long as the workpiece can be extracted from the ring. Likewise that part of the core which contacts the workpiece may be tapered or stepped in the axial direction. Furthermore, the inner surface of the ring may be formed with suitable indentations in the circumferential direction so that, for example, when the metal of the workpiece is forced into the indentations, gear teeth or the like are formed. In fact, the angles usually associated with conventional gear teeth lend themselves admirably to the use of the process and apparatus of the invention in the making of rings with gear teeth on their peripheries.

Figure 12:
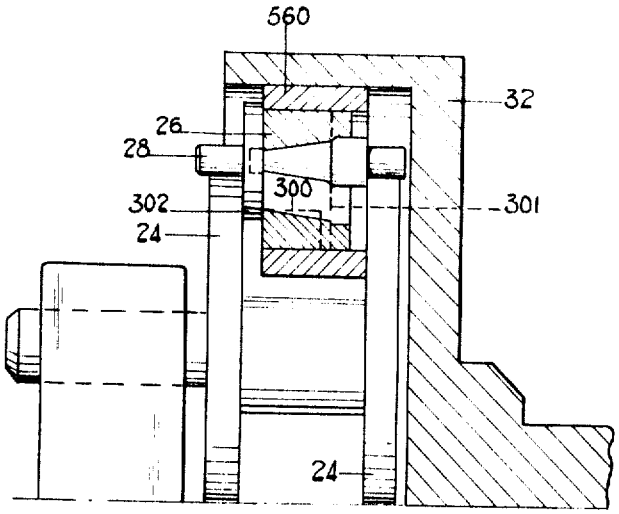
FIGURE 12 is a view similar to FIGURE 4 of a machine employing [the principles of FIGURE 11] *features of the embodiments of FIGURES 4 and 5 and FIGURE 11.*

It is obviously impossible to illustrate all the permutations and combinations. FIGURE 12 illustrates one of the many possible cases. In this figure a machine according to FIGURES 4 and 5 has been modified to incorporate the teachings of FIGURE 11.

In this case an anvil ring 560 is interposed between the roller 32 and the workpiece. The object is to form a roller bearing part which has an inner conical taper. *The flange 302 forms a shoulder to control the axial spread of the workpiece.* The workpiece in its final shape is sectioned and marked 26. The final shape does not include the piece to the right of the dotted line 301 which piece is removed by machining or the like. The core 28 is formed with a flange 302 running against the anvil ring 560. The part of the core that carries the flange 302 is detachably connected to the remainder of the core to allow the workpiece to the threaded on to and off the core.

The dotted line 300 indicates the initial section of the annular workpiece inserted into the machine.

In practice it has been found that with the parts well lubricated the final product can be tapped out of the anvil ring 560 with ease even when the outer periphery of the workpiece is round cylindrical.

We claim:

1. A machine for profiling annular workpieces comprising juxtaposed rollers defining between them a profiling space of diminishing extent, means to rotate at least one of the rollers, a cylindrical core loosely positioned through an annular workpiece to project each side of it, the projecting ends rolling on at least one of the rollers, and means to control the axial spread, in at least one direction, of a workpiece surrounding the core and passing through the profiling space.

2. The machine of claim 1 including an anvil ring which resists substantial deformation, adapted to enclose a workpiece and shaped to allow removal of a finished workpiece.

3. The machine of claim 2 in which the anvil ring and the core are shaped to limit deformation in at least one axial direction of the workpiece.

4. The machine claimed in claim 3 in which the core has an annular flange abutting the anvil ring.

5. The machine claimed in claim 4 in which the part of the core that carries the flange is detachably connected to the remainder of the core.

*6. A machine for profiling annular workpieces, comprising two juxtaposed surfaces that define a convergent throat, a core threaded loosely through an annular workpiece with an end projecting to each side of the workpiece, one of the surfaces being adapted to support the ends of the core while a zone of the core between its ends contacts the inner surface of the workpiece, and the second surface contacting the outer face of the workpiece so that a segment of the workpiece is squeezed between the core and the second surface, and means to move the surfaces relatively so that the workpiece and core rotate and advance through the throat with the core ends rolling on the first surface, and the workpiece being progressively squeezed and profiled between the core and the second surface.*

*7. The machine of claim 6 in which the first and second surfaces are provided by juxtaposed rollers arranged for rotation about their axes, those axes being parallel, means being provided to drive the rollers at relatively different peripheral speeds, so that a workpiece and core in the throat advance through it from one side to the other of the plane defined by the roller axes.*

*8. The machine of claim 6 in which the first surface is flat in the zones of contact between that surface and the ends of the core, the ends of the core being cylindrical.*

*9. The machine of claim 6, including an anvil ring to surround the workpiece, the inner face of the anvil ring contacting and profiling the outer face of the workpiece, and the outer face of the anvil ring rolling on the second surface.*

*10. The machine of claim 7 including an anvil ring to surround the workpiece, the inner face of the anvil ring contacting and profiling the outer face of the workpiece, and the outer face of the anvil ring rolling on the second roller.*

*11. The machine of claim 8, including an anvil ring to surround the workpiece, the inner face of the anvil ring contacting and profiling the outer face of the workpiece, and the outer face of the anvil ring rolling on the second surface.*

*12. The machine of claim 9, including means to stop the axial spread of the workpiece in at least one direction.*

References Cited

The following references, cited by the Examiner, are of record in the patented file of this patent or the original patent.

UNITED STATES PATENTS

| | | | |
|---|---|---|---|
| 426,707 | 4/1890 | Bowden et al. | 80—5 |
| 1,496,038 | 6/1924 | Venable | 80—5 |
| 1,561,294 | 11/1925 | Almquist | 80—5 |
| 1,596,538 | 8/1926 | Ingram | 80—5 |
| 1,996,181 | 4/1935 | Wait | 80—5 |

MILTON S. MEHR, *Primary Examiner.*

U.S. Cl. X.R.

72—88, 91, 94, 111, 113, 115